United States Patent [19]

Koga

[11] Patent Number: 5,032,905
[45] Date of Patent: Jul. 16, 1991

[54] ACCURATE DETECTION OF A DRASTIC CHANGE BETWEEN SUCCESSIVE PICTURES

[75] Inventor: Toshio Koga, Tokyo, Japan
[73] Assignee: NEC Corporation, Tokyo, Japan
[21] Appl. No.: 522,026
[22] Filed: May 11, 1990

[30] Foreign Application Priority Data

May 11, 1989 [JP] Japan ................................. 1-116121

[51] Int. Cl.⁵ .............................................. H04N 7/18
[52] U.S. Cl. ..................................... 358/105; 358/136
[58] Field of Search ................. 358/105, 136, 135, 140

[56] References Cited

U.S. PATENT DOCUMENTS 4,689,672  8/1987  Furukawa et al.
4,875,094  10/1989  Haghiri et al. ...................... 358/105
4,890,160  12/1989  Thomas .............................. 358/105

Primary Examiner—Victor R. Kostak
Attorney, Agent, or Firm—Sughrue, Mion, Zinn, Macpeak & Seas

[57] ABSTRACT

On detecting a drastic change, such as a scene change, between current and previous ones of successive pictures which are represented by a digital video signal and each of which comprises a predetermined number of picture elements, the digital video signal is processed by using correlations between the picture elements within each of the successive pictures to produce a processed signal which represents processed results for each of the successive pictures. A statistical distribution of the processed results is calculated from the processed signal. The statistical distribution of the processed results in the current picture is collated with the statistical distribution of the processed results in the previous picture to be produced as a change detection signal representative of the drastic change with reference to a relationship between the statistical distribution of the processed results in the current picture and the statistical distribution of the processed results in the previous picture. The processed signal may be obtained by producing a difference signal between the digital video signal and a prediction signal predictive of the digital video signal by using the correlations. Alternatively, an orthogonal transform is carried out for the digital video signal to produce the processed signal.

12 Claims, 3 Drawing Sheets (A) i-th PICTURE (B) (i+1)-th PICTURE (A) n-th PICTURE (B) (n+1)-th PICTURE

ACCURATE DETECTION OF A DRASTIC CHANGE BETWEEN SUCCESSIVE PICTURES

BACKGROUND OF THE INVENTION

This invention relates to a method of detecting a drastic change between two adjacent ones of successive pictures represented by an input digital video signal. This invention relates also to a detecting device for use in carrying out the method.

The input digital video signal is, for example, a television signal. Each of the successive pictures comprises a predetermined number of picture elements and corresponds to a frame of the input digital video signal.

As will later be described, a conventional detecting method makes use of a correlation between two successive pictures in order to detect the drastic or large change, such as a scene change, between two adjacent ones of successive pictures. More specifically, a frame memory delays the input digital video signal into a delayed digital video signal having a delay which is equal to one frame of the input digital video signal. A subtracter produces a difference signal representative of a difference between the input digital video signal and the delayed digital video signal. Responsive to the difference signal, a first comparator compares an absolute value of the difference with a first threshold value for each picture element to produce first and second comparison result signals when the absolute value is greater than the first threshold value and when the absolute value is not greater than the first threshold value, respectively. A counter counts the first comparison result signals for each picture to produce a count signal. A second comparator compares the count signal with a second threshold value to produce a change detection signal representative of the drastic change when the count signal is greater than the second threshold value.

The conventional method is, however, defective in that the change detection signal is produced even when a large object body moves so that the large object body has different positions in a current picture and in a previous picture which are two adjacent ones of the successive pictures. The conventional method is therefore incapable of accurately detecting a drastic change.

SUMMARY OF THE INVENTION

It is therefore a general object of this invention to provide a method of accurately detecting a drastic change between two successive pictures.

It is a specific object of this invention to provide a detecting device for accurately detecting a drastic change between two successive pictures.

Other objects of this invention will become clear as the description proceeds.

On describing the gist of this invention, it is possible to understand that a method is for detecting a change between current and previous pictures which are two adjacent ones of successive pictures represented by an input digital video signal. Each of the successive pictures comprises a predetermined number of picture elements.

According to this invention, the above-understood method comprises the steps of: processing the input digital video signal by using correlations between the picture elements within each of the successive pictures to produce a processed signal which represents processed results for each of the successive pictures; calculating a statistical distribution of the processed results in response to the processed signal; and collating the statistical distribution of the processed results in the current picture with the statistical distribution of the processed results in the previous picture to produce a change detection signal representative of the change with reference to a relationship between the statistical distribution of the processed results in the current picture and the statistical distribution of the processed results in the previous picture.

On describing the gist of this invention, it is furthermore possible to understand that a detecting device is for detecting a change between current and previous pictures which are two adjacent ones of successive pictures represented by an input digital video signal. Each of the successive pictures comprises a predetermined number of picture elements.

According to this invention, the above-understood detecting device comprises: processing means for processing the input digital video signal by using correlations between the picture elements within each of the successive pictures to produce a processed signal which represents processed results for each of the successive pictures; statistical distribution calculating means connected to the processing means and supplied with the processed signal for calculating a statistical distribution of said processed results; and collating means connected to the statistical distribution calculating means for collating the statistical distribution of the processed results in the current picture with the statistical distribution of the processed results in the previous picture to produce a change detection signal representative of said change with reference to a relationship between the statistical distribution of the processed results in the current picture and the statistical distribution of the processed results in the previous picture.

DESCRIPTION OF THE PREFERRED EMBODIMENT

Figure 1:
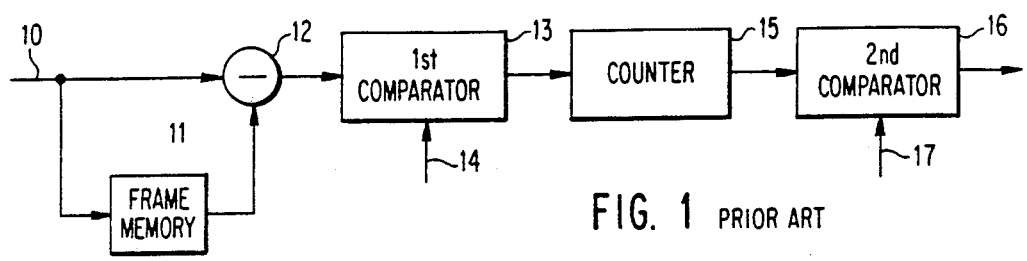
FIG. 1 is a block diagram of a detecting device for use in describing a conventional method.

Referring to FIG. 1, description will now be made at first as regards a conventional detecting device for use in carrying out a conventional method which is equivalent to that described in the preamble of the instant specification. The conventional detecting device is for detecting a drastic change, such as a scene change, between two adjacent ones of successive pictures represented by an input digital video signal 10.

The conventional detecting device comprises a frame memory 11 which delays the input digital video signal 10 into a delayed digital video signal having a delay which is equal to one frame of the input digital video signal. A subtracter 12 produces a difference signal representative of a difference (namely, an interframe difference) between the input digital video signal 10 and the delayed digital video signal.

Responsive to the difference signal, a first comparator 13 compares an absolute value of the difference with a first threshold value 14 for each picture element. The first comparator 13 thereby produces first and second comparison result signals when the absolute value is greater than the first threshold value 14 and when the absolute value is not greater than the first threshold value 14, respectively.

A counter 15 counts the first comparison result signals for each picture to produce a count signal. A second comparator 16 compares the count signal with a second threshold value 17 to produce a change detection signal representative of the drastic change when the count signal is greater than the second threshold value 17.

Inasmuch as the conventional method makes use of a correlation between two successive pictures in order to detect the drastic change between two adjacent ones of the successive pictures, the conventional method is defective in that the change detection signal is incorrectly produced in a case where a large image of, for example, an object body has different positions in current and previous pictures which are two adjacent ones of the successive pictures. The change detection signal is also incorrectly produced when a background surrounding the object body changes in brightness in the current and the previous pictures.

Figure 2:
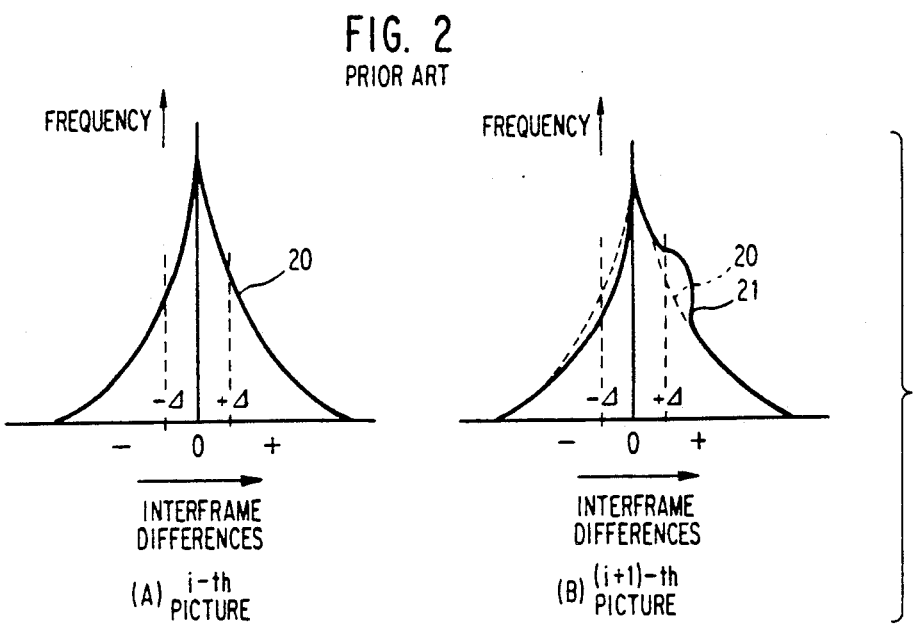
FIGS. 2(A) and 2(B) are graphs for use in describing a drawback of the detecting device illustrated in FIG. 1.

Turning to FIGS. 2(A) and 2(B) with reference to FIG. 1 continued, the reason will be described why the change detection signal is produced even when a large image has different positions in the current and the previous pictures. In FIG. 2(A), a solid-line curve 20 shows a frequency distribution of the interframe differences which are produced by the subtracter 12 for an i-th picture of the input digital video signal 10. The first comparator 13 compares each of the interframe differences with the first threshold value 14 for each picture element. The first threshold value 14 has plus and minus threshold values $\pm \Delta$ shown in FIG. 2. The first comparator 13 thereby produces the first comparison result signal when an absolute value of each of the interframe differences is greater than another absolute value of each of the plus and minus threshold value $\pm \Delta$. The counter 15 counts the first comparison result signals for each picture and produces a count signal. The second comparator 16 compares the count signal with the second threshold value 17 to produce the change detection signal when the count signal is greater than the second threshold value 17. For the frequency distribution of the interframe differences illustrated in FIG. 2(A), the second comparator 16 produces no change detection signal.

It is assumed that a large image moves so that the large image has different positions in the i-th picture and an (i+1)-th picture which next succeeds the i-th picture in the input digital video signal 10. In FIG. 2(B), another solid-line curve 21 shows another frequency distribution of the interframe differences which are produced by the subtracter 12 for the (i+1)-th picture. For the frequency distribution of the interframe differences illustrated in FIG. 2(B), the second comparator 16 inevitably produces the change detection signal although the drastic change, such as the scene change, does not actually occur.

Figure 3:
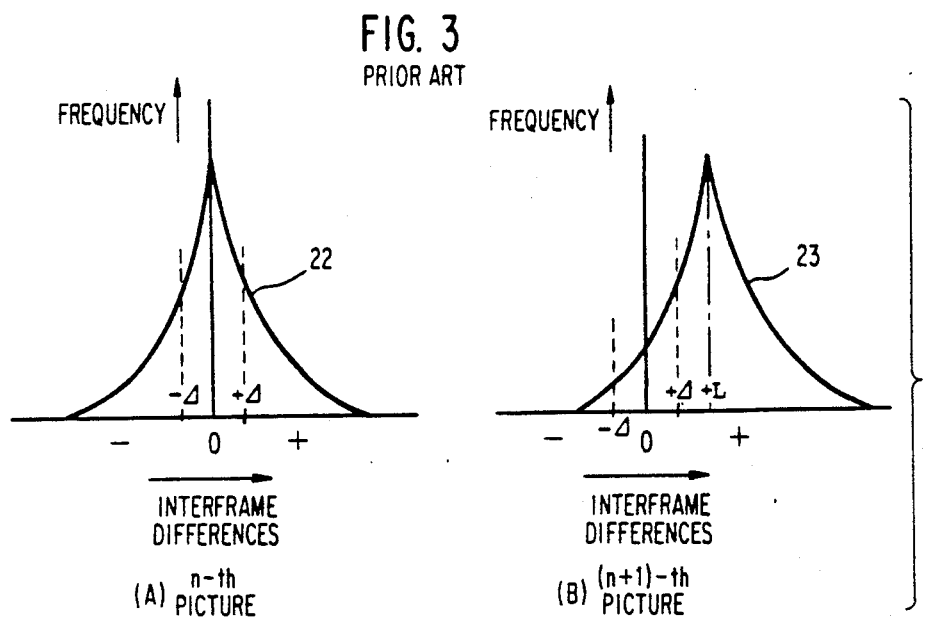
FIGS. 3(A) and 3(B) are graphs for use in describing another drawback of the detecting device illustrated in FIG. 1.

Turning to FIGS. 3(A) and 3(B) with reference to FIG. 1 continued, description will be made as regards another case where the change detection signal is incorrectly produced. In FIG. 3(A), a solid-line curve 22 shows a frequency distribution of the interframe differences which are produced by the subtracter 12 for an n-th picture of the input digital video signal 10. The frequency distribution of the interframe differences has an average level which is substantially equal to zero. For the frequency distribution of the interframe differences illustrated in FIG. 3(A), the second comparator 16 produces no change detection signal like for the frequency distribution illustrated in FIG. 2(A).

In FIG. 3(B), another solid-line curve 23 shows a different frequency distribution of the interframe differences which are produced for an (n+1)-th picture which next succeeds the n-th picture in the input digital video signal 10. The different frequency distribution of the interframe differences has another average level which is substantially equal to a positive value $+L$. The positive value $+L$ is greater than the plus threshold value $+\Delta$. That is, an offset is generated in an entire area of the (n+1)-th picture. For the different frequency distribution of the interframe differences illustrated in FIG. 3(B), the second comparator 16 unavoidably produces the change detection signal although the drastic change, such as the scene change, does not occur in fact.

Such a frequency distribution illustrated in FIG. 3(B) may be produced when operation is started for an automatic iris diaphragm unit of a television camera connected to the detecting device. When either a fluctuation of illumination or a flicker occurs in light sources illuminating the object body, the frequency distribution illustrated in FIG. 3(B) may also be produced.

Figure 4:
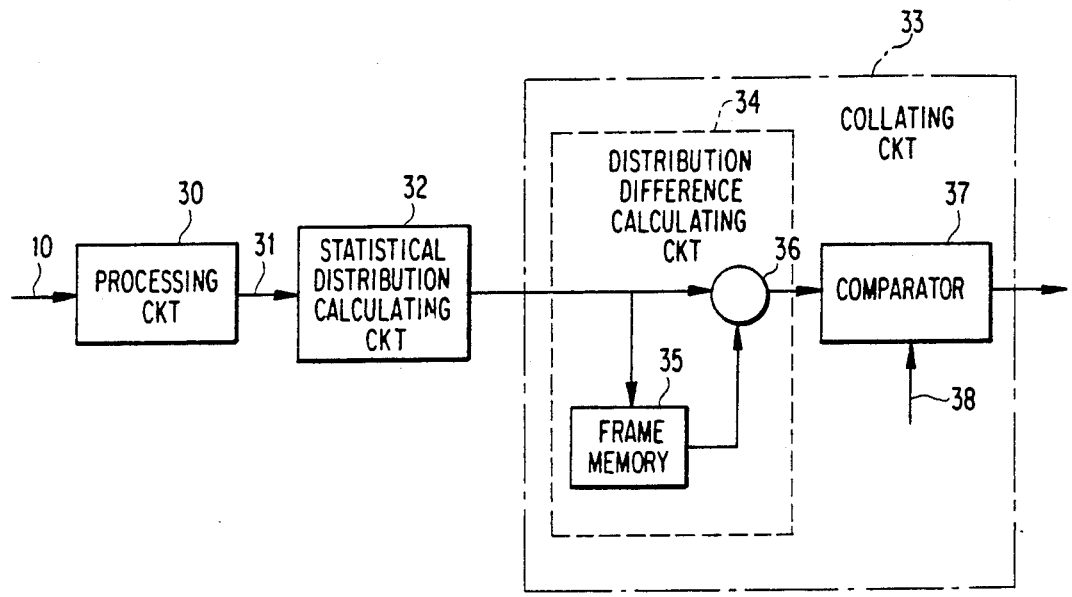
FIG. 4 is a block diagram of a detecting device for use in carrying out a method according to an embodiment of this invention.

Turning to FIG. 4, description will proceed to a detecting device for use in carrying out a method according to a preferred embodiment of this invention. The detecting device is for detecting a drastic change, such as a scene change, between current and previous pictures which are two adjacent ones of successive pictures represented by the input digital video signal 10. Each of the successive pictures comprises a predetermined number of picture elements.

A processing circuit 30 processes the input digital video signal 10 by using correlations between the picture elements within each of the successive pictures. The processing circuit 30 thereby produces a processed signal 31 which represents processed results for each of the successive pictures. Use of the correlations within each picture can reduce an influence of a movement of the large body from the previous picture to the current picture. It is also possible to reduce another influence of the offset generated in an entire area of the current picture by either the fluctuation of illumination or the flicker which occurs in the light sources surrounding the object body. The processing circuit 30 will later be described more in detail.

A statistical distribution calculating circuit 32 is connected to the processing circuit 30. Supplied with the processed signal 31, the statistical distribution calculating circuit 32 calculates a statistical distribution of the processed results. The statistical distribution calculating circuit 32 will later be described.

A collating circuit 33 is connected to the statistical distribution calculating circuit 32. The collating circuit 33 collates the statistical distribution of the processed results in the current picture with the statistical distribution of the processed results in the previous picture and produces a change detection signal representative of the drastic change, such as the scene change, with reference to a relationship between the statistical distribution of the processed results in the current picture and the statistical distribution of the processed results in the previous picture.

The collating circuit 33 comprises a distribution difference calculating circuit 34 connected to the statistical distribution calculating circuit 32. The distribution difference calculating circuit 34 calculates distribution differences between the statistical distribution of the processed results in the current picture and the statistical distribution of the processed results in the previous picture.

More specifically, a frame memory (namely, a temporary memory) 35 is connected to the statistical distribution calculating circuit 32. The frame memory 35 temporarily memorizes the statistical distribution of the processed results in the current picture during one frame of the input digital video signal 10 and produces a delayed distribution having a delay which is equal to one frame.

A subtracter 36 is connected to the statistical distribution calculating circuit 32 and the frame memory 35. The subtracter 36 calculates differences between the statistical distribution of the processed results in the current picture and the delayed distribution as the distribution differences.

A comparator 37 is connected to the distribution difference calculating circuit 34. The comparator 37 compares each of the distribution differences with a predetermined threshold value 38. The comparator 37 thereby produces the change detection signal with reference to a relationship between each of the distribution differences and the predetermined threshold value 38.

The distribution difference calculating circuit 34 may calculate a sum of absolute values of the distribution differences. In this case, the comparator 37 compares the sum of the absolute values of the distribution differences with the predetermined threshold value 38 and produces the change detection signal when the sum of the absolute values of the distribution differences is greater than the predetermined threshold value 38.

As an alternative, the distribution difference calculating circuit 34 may calculate another sum of frequencies or times when the distribution differences have absolute values each of which is greater than a preselected level. In this case, the other sum is compared with the predetermined threshold value 38 in the comparator 37. As a further alternative, the distribution difference calculating circuit 34 may calculate a product of the preselected level and the frequencies.

As a still further alternative, the distribution difference calculating circuit 34 may calculate a pattern of the distribution differences. In this case, the comparator 37 may compare the pattern of the distribution differences with a reference pattern.

Figure 5:
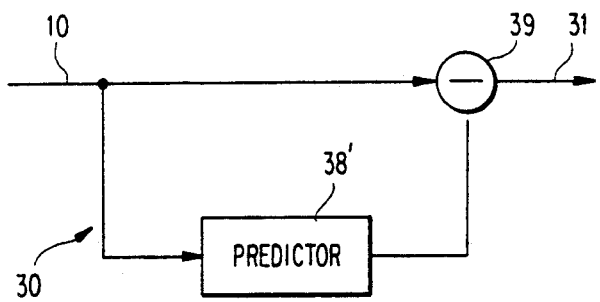
FIG. 5 is a block diagram of a processing circuit of the detecting device illustrated in FIG. 4.

Turning to FIG. 5, the processing circuit 30 comprises a predictor (namely, a prediction signal producing circuit) 38'. Responsive to the input digital video signal 10, the predictor 38' produces a prediction signal predictive of the input digital video signal 10 by using correlations between the picture elements within each of the successive pictures in the manner which will presently be described. Connected to the predictor 38, another subtracter (namely, a difference signal producing circuit) 39 produces, as the processed signal 31, a difference signal which represents, as the processed results, differences between the input digital video signal 10 and the prediction signal for each of the successive pictures.

The predictor 38' has a predictive function so that prediction of a particular element of the picture elements of the current picture is carried out by the use of a previous element of the picture elements of the current picture. The particular element next succeeds the previous element in the input digital video signal 10.

Figure 6:
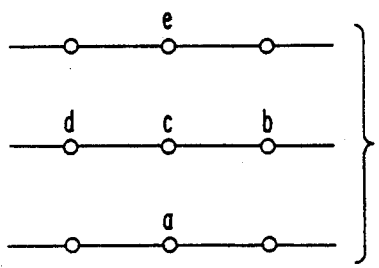
FIG. 6 is a diagram for use in describing operation of the processing circuit illustrated in FIG. 5.

Supposing in FIG. 6 that the particular element is designated by c, the previous element corresponds to an element designated by d. In FIG. 6, three of scanning lines of the input digital video signal 10 are depicted by parallel lines.

As an alternative, the predictor 38' illustrated in FIG. 5 may have another predictive function in which prediction of a particular element of a specific line of the scanning lines of the current picture is carried out by the use of a corresponding element of a previous line of the scanning lines of the current picture. The specific line next succeeds the previous line in the input digital video signal 10. The corresponding element corresponds to the particular element. Supposing in FIG. 6 again that the particular element is designated by c, the corresponding element is an element designated by e.

As a further alternative, prediction of the particular element c illustrated in FIG. 6 may be carried out by the use of either a combination of the previous element d and the corresponding element e or another combination of picture elements a, b, d, and e which surround the particular element c. In the latter case, the processing circuit 30 (FIG. 4) produces the processed signal 31 (FIG. 4) representative of a result of a calculation of $c-(a+b+d+e)/4$, where a, b, c, d, and e represent amplitude values of the picture elements a, b, c, d, and e, respectively. Such a processing circuit will be exemplified in the following.

Figure 7:
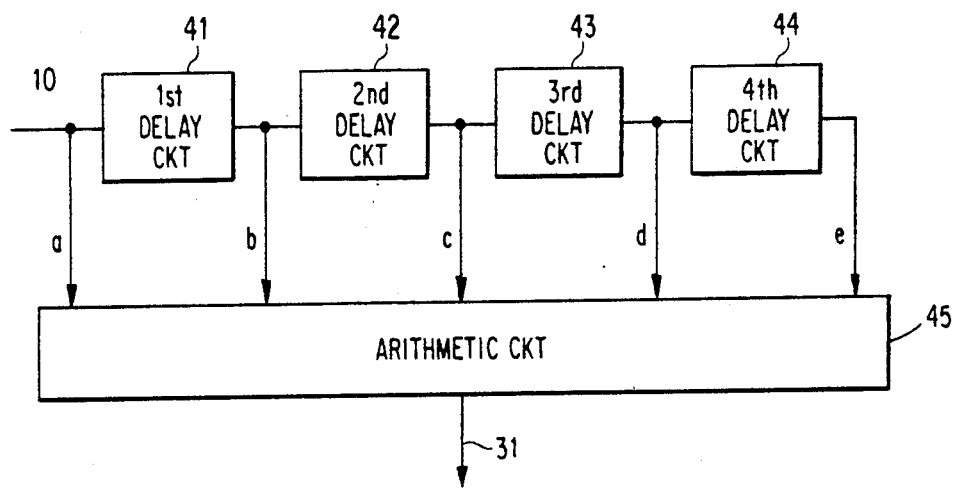
FIG. 7 is a block diagram of another processing circuit which may be used in the detecting device illustrated in FIG. 4.
Figure 8:
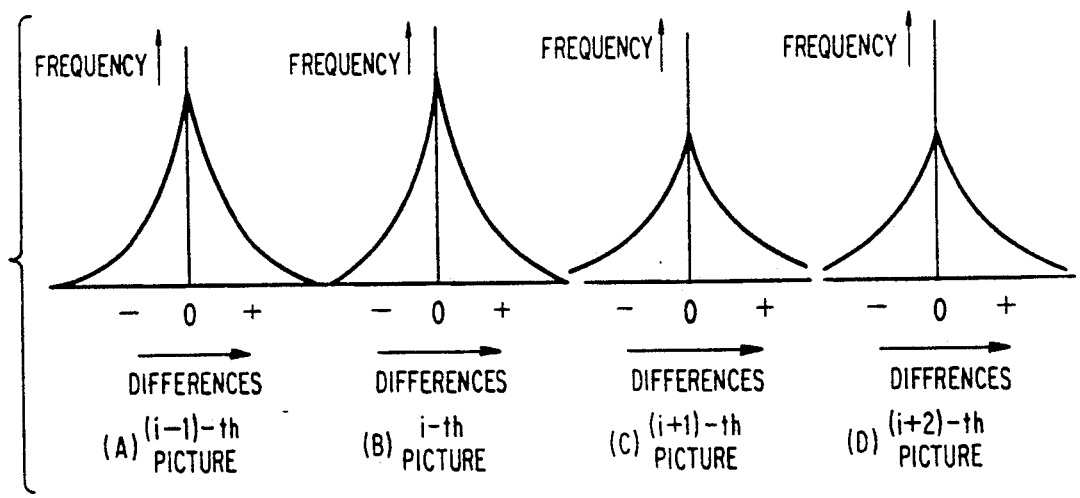
FIGS. 8(A), 8(B), 8(C), and 8(D) are graphs for use in describing operation of a statistical distribution calculating circuit of the detecting device illustrated in FIG. 4.

Referring to FIG. 7, the processing circuit comprises a first delay circuit 41 for delaying the input digital video signal 10 by a first delay which is equal to a period of each scanning line minus another period of each picture element. The first delay circuit 41 thereby produces a first delayed signal. A second delay circuit 42 delays the first delayed signal by a second delay which is equal to the other period of each picture element. The second delay circuit 42 thereby produces a second delayed signal. A third delay circuit 43 delays the second delayed signal by the second delay and produces a third delayed signal. A fourth delay circuit 44 delays the third delayed signal by the first delay and produces a fourth delayed signal.

With this arrangement of the first through the fourth delay circuits 41 to 44, the first through the fourth delayed signals represent the picture elements b, c, d, and e (FIG. 6), respectively, at a time instant when the input digital video signal 10 represents the picture element a (FIG. 6).

Responsive to the input digital video signal 10, and the first through the fourth delayed signals, an arithmetic circuit 45 produces the processed signal 31 representative of a result of the calculation of $c-(a$ +b+d+e)/4 at the time instant when the input digital video signal 10 represents the picture element a (FIG. 6).

Turning to FIGS. 8(A), 8(B), 8(C), and 8(D), the statistical distribution calculating circuit 32 illustrated in FIG. 4 will be described more in detail. As described with reference to FIGS. 5 and 6, the processing circuit 30 produces, as the processed signal 31, a difference signal representative of a difference between one of the picture elements of the current picture and a previous element which is followed by the above-mentioned one of the picture elements of the current picture.

The statistical distribution calculating circuit 32 produces, as the statistical distribution, a frequency distribution of the differences between picture elements within each picture. The statistical distribution calculating circuit 32 may be constituted by a combination of a comparator and a counter.

In each of FIGS. 8(A), 8(B), 8(C), and 8(D), a frequency distribution of the differences is exemplified for each of (i−1)-th, i-th, (i+1)-th, and (i+2)-th pictures which are four successive pictures. Almost no change occurs in the statistical distribution between the (i−1)-th picture and the i-th picture. A large change appears in the statistical distribution between the i-th picture and the (i+1)-th picture. Almost no change appears in the statistical distribution between the (i+1)-th picture and the (i+2)-th picture. It may be understood that each of the (i−1)-th and the i-th pictures has a small amount of comparatively complicated patterns and that each of the (i+1)-th and the (i+2)-th pictures has a lot of the comparatively complicated patterns.

The collating circuit 33 (FIG. 4) produces the change detection signal when a large change appears in the statistical distribution, namely, when the collating circuit 33 processes the (i+1)-th picture.

The detecting device illustrated in FIG. 4 may be used in, for example, a coding device for carrying out predictive coding of a digital video signal by using correlation between two successive pictures. Such a coding device is disclosed, for example, in U.S. Pat. No. 4,689,672 issued to Akihiro Furukawa et al and assigned to the present assignee. In the Furukawa et al device, a change detection signal is produced as a result of a drastic change, such as a scene change, from a previous picture to a current picture. The digital video signal is separated, in response to the change detection signal, into a preceding part ending at the previous picture and a succeeding part which begins at the current picture. Furthermore, the change detection signal controls the predictive coding so that the succeeding part be coded with an area of predictive coding of each picture gradually widened with time. According to Furukawa et al, pictures can be reproduced with a high quality even when the drastic change occurs.

While this invention has thus far been described in conjunction with a single preferred embodiment thereof, it will readily be possible for those skilled in the art to put this invention into practice in various other manners. For example, an orthogonal transform circuit may be used as the processing circuit 30 illustrated in FIG. 4. The orthogonal transform circuit is for carrying out either of a one-dimensional and a two-dimensional orthogonal transform of the input digital video signal 10 to produce, as the processed signal 31, a result signal which represents, as the processed results, transform results of the orthogonal transform for each of the successive pictures.

When the orthogonal transform circuit is used, the statistical distribution calculating circuit 32 calculates a statistical distribution of coefficient values of transform coefficients which are produced as the transform results of the orthogonal transform. Inasmuch as the coefficient values represent discrete frequency components, respectively, which belong to a frequency range from a direct current component to a high frequency component, it is possible to elevate an accuracy of detecting the drastic change by calculating the statistical distribution of the coefficient values for the discrete frequency components in each picture and by collating the statistical distribution of the coefficient values in the current picture with the statistical distribution of the coefficient values in the previous picture. The collating circuit 33 collates the statistical distribution of the coefficient values in the current picture with the statistical distribution of the coefficient values in the previous picture in the manner described in conjunction with FIG. 4. When the two-dimensional orthogonal transform is carried out for each block comprising a predetermined number N of samples (namely, picture elements) and the same number N of the scanning lines, the number $N \times N$ of the discrete frequency components are obtained from each block. It is possible to remove the offset by subtracting from each of the coefficient values a lowest one of the coefficient values that represents the direct current component.

What is claimed is:

1. A method of detecting a scene change between current and previous pictures which are two adjacent ones of successive pictures represented by an input digital video signal, each of said successive pictures comprising a predetermined number of picture elements, said method comprising the steps of:

processing said input digital video signal by using correlations between the picture elements within each of said successive pictures to produce a processed signal which represents processed results for each of said successive pictures;

calculating a statistical distribution of said processed results in response to said processed signal; and collating the statistical distribution of said processed results in said current picture with the statistical distribution of said processed results in said previous picture to produce a change detection signal representative of said scene change with reference to a relationship between the statistical distribution of said processed results in said current picture and the statistical distribution of said processed results in said previous picture.

2. A method as claimed in claim 1, wherein said processing step comprises the steps of:

predictively producing, in response to said input digital video signal, a prediction signal predictive of said input digital video signal by using correlations between the picture elements within each of said successive pictures; and producing, as said processed signal, a difference signal which represents, as said processed results, differences between said input digital video signal and said prediction signal for each of said successive pictures.

3. A method as claimed in claim 1, wherein said processing step is for carrying out an orthogonal transform of said input digital video signal to produce, as said processed signal, a result signal which represents, as said processed results, transform results of said orthogonal transform for each of said successive pictures.

4. A method as claimed in claim 1, wherein said collating step comprises the steps of:
calculating distribution differences between the statistical distribution of said processed results in said current picture and the statistical distribution of said processed results in said previous picture; and
comparing each of said distribution differences with a predetermined threshold value to produce said change detection signal with reference to a relationship between each of said distribution differences and said predetermined threshold value.

5. A method as claimed in claim 4, wherein said distribution difference calculating step comprises the steps of:
temporarily memorizing the statistical distribution of said processed results in said current picture during one frame of said input digital video signal to produce a delayed distribution having a delay which is equal to said one frame; and
producing differences between the statistical distribution of said processed results in said current picture and said delayed distribution as said distribution differences.

6. A method as claimed in claim 4, wherein:
said distribution difference calculating step is for calculating a sum of absolute values of said distribution differences;
said comparing step being for comparing said sum with said predetermined threshold value to produce said change detection signal when said sum is greater than said predetermined threshold value.

7. A detecting device for detecting a scene change between current and previous pictures which are two adjacent ones of successive pictures represented by an input digital video signal, each of said successive pictures comprising a predetermined number of picture elements, said device comprising:
processing means for processing said input digital video signal by using correlations between the picture elements within each of said successive pictures to produce a processed signal which represents processed results for each of said successive pictures;
statistical distribution calculating means connected to said processing means and supplied with said processed signal for calculating a statistical distribution of said processed results; and
collating means connected to said statistical distribution calculating means for collating the statistical distribution of said processed results in said current picture with the statistical distribution of said processed results in said previous picture to produce a change detection signal representative of said scene change with reference to a relationship between the statistical distribution of said processed results in said current picture and the statistical distribution of said processed results in said previous picture.

8. A detecting device as claimed in claim 7, wherein said processing means comprises:

prediction signal producing means responsive to said input digital video signal for predictively producing a prediction signal predictive of said input digital video signal by using correlations between the picture elements within each of said successive pictures; and
difference signal producing means connected to said prediction signal producing means for producing, as said processed signal, a difference signal which represents, as said processed results, differences between said input digital video signal and said prediction signal for each of said successive pictures.

9. A detecting device as claimed in claim 7, wherein said processing means is for carrying out an orthogonal transform of said input digital video signal to produce, as said processed signal, a result signal which represents, as said processed results, transform results of said orthogonal transform for each of said successive pictures.

10. A detecting device as claimed in claim 7, wherein said collating means comprises:
distribution difference calculating means connected to said statistical distribution calculating means for calculating distribution differences between the statistical distribution of said processed results in said current picture and the statistical distribution of said processed results in said previous picture; and
comparing means connected to said distribution difference calculating means for comparing each of said distribution differences with a predetermined threshold value to produce said change detection signal with reference to a relationship between each of said distribution differences and said predetermined threshold value.

11. A detecting device as claimed in claim 10, wherein said distribution difference calculating means comprises:
temporary memorizing means connected to said statistical distribution calculating means for temporarily memorizing the statistical distribution of said processed results in said current picture during one frame of said input digital video signal to produce a delayed distribution having a delay which is equal to said one frame; and
means connected to said statistical distribution calculating means and to said temporary memorizing means for producing differences between the statistical distribution of said processed results in said current picture and said delayed distribution as said distribution differences.

12. A detecting device as claimed in claim 10, wherein:
said distribution difference calculating means is for calculating a sum of absolute values of said distribution differences;
said comparing means being for comparing said sum with said predetermined threshold value to produce said change detection signal when said sum is greater than said predetermined threshold value.

* * * * *